(12) United States Patent
Jaraudias et al.

(10) Patent No.: US 11,977,502 B2
(45) Date of Patent: May 7, 2024

(54) UNIVERSAL ETHERNET SOLUTION

(71) Applicant: Schneider Electric Industries SAS, Rueil Malmaison (FR)

(72) Inventors: Patrice Jaraudias, Biot (FR); Jean-Jacques Adragna, Nice (FR); Antonio Chauvet, Juan les pints (FR); Gary R. Ware, Newton, MA (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/056,210

(22) Filed: Aug. 6, 2018

(65) Prior Publication Data
US 2018/0349308 A1 Dec. 6, 2018

Related U.S. Application Data

(63) Continuation of application No. 14/895,544, filed as application No. PCT/IB2014/002133 on Jun. 19, 2014, now Pat. No. 10,042,793.
(Continued)

(51) Int. Cl.
*G06F 13/28* (2006.01)
*G06F 13/362* (2006.01)
(Continued)

(52) U.S. Cl.
CPC ............ *G06F 13/28* (2013.01); *G06F 13/362* (2013.01); *G06F 13/4022* (2013.01);
(Continued)

(58) Field of Classification Search
CPC ... H04L 12/413; H04L 49/109; H04L 49/351; H04L 69/12; H04L 69/18
See application file for complete search history.

(56) References Cited

U.S. PATENT DOCUMENTS 5,970,069 A 10/1999 Kumar
2002/0141438 A1 10/2002 Smith et al.
(Continued)

FOREIGN PATENT DOCUMENTS

CN 1910571 A 2/2007
CN 103095538 A 5/2013
WO WO 2005/013143 A2 2/2005

OTHER PUBLICATIONS

First Office Action dated Dec. 1, 2017 by the Chinese Patent Office in corresponding Chinese Application No. 201480041254.6 and its English Translation.
(Continued)

*Primary Examiner* — Henry Tsai
*Assistant Examiner* — Aurangzeb Hassan
(74) *Attorney, Agent, or Firm* — Locke Lord LLP

(57) ABSTRACT

A monolithic integrated circuit that supports multiple industrial Ethernet protocols, fieldbus protocols, and industrial application processing, thereby providing a single hardware platform that may be used to build various automation devices/equipment implemented in an industrial network, such as controllers, field devices, network communication nodes, etc. The monolithic integrated circuit may comprise at least one application processor core operable to execute an industrial application and Ethernet connectivity/management code, including standard Ethernet connectivity/management code and industrial Ethernet connectivity/management code; a real time processing module configured to support a plurality of industrial Ethernet data link layers; an interface configured to be coupled to an external non volatile memory from which the at least one application processor is configured for execute in place processing; and on-chip RAM having a capacity sufficient to eliminate the need for external RAM in execution by the at least one application
(Continued)

processor core of an operating system, the industrial application, and the Ethernet connectivity/management code.

21 Claims, 14 Drawing Sheets

Related U.S. Application Data

(60) Provisional application No. 61/837,022, filed on Jun. 19, 2013.

(51) Int. Cl.
    *G06F 13/40*     (2006.01)
    *H04L 12/413*     (2006.01)
    *H04L 49/109*     (2022.01)
    *H04L 49/351*     (2022.01)
    *H04L 69/12*     (2022.01)
    *H04L 69/18*     (2022.01)

(52) U.S. Cl.
    CPC .......... *H04L 12/413* (2013.01); *H04L 49/109* (2013.01); *H04L 49/351* (2013.01); *H04L 69/12* (2013.01); *H04L 69/18* (2013.01); *G06F 13/4027* (2013.01)

(56) References Cited

U.S. PATENT DOCUMENTS

| | | |
|---|---|---|
| 2003/0110344 A1 | 6/2003 | Szczepanek et al. |
| 2005/0021874 A1 | 1/2005 | Georgiou et al. |
| 2008/0274646 A1 | 11/2008 | Schoop |
| 2010/0058087 A1 | 3/2010 | Borras |
| 2011/0047313 A1 | 2/2011 | Hui |
| 2012/0102144 A1 | 4/2012 | Fritsche |
| 2013/0097273 A1 | 4/2013 | Yoon |
| 2013/0173868 A1 | 7/2013 | Leyrer |
| 2013/0275576 A1 | 10/2013 | Hinz |
| 2015/0106872 A1 | 4/2015 | Hiser |
| 2016/0070669 A1 | 3/2016 | Edmiston |

OTHER PUBLICATIONS

International Preliminary Report on Patentability and Written Opinion dated Dec. 30, 2015 in PCT/IB2014/002133 filed Jun. 19, 2014.
International Search Report dated Mar. 18, 2015 in PCT/IB2014/002133.
Naotaka Maruyama, Tohru Ishihara, Hiroto Yasuura, "An RTOS in hardware for energy efficient software-based TCP/IP processing", Application Specific Processors (SASP) 2010 IEEE 8th Symposium on, pp. 58-63, 2010.
P. Kohout, B. Ganesh and B. Jacob, "Hardware support for real-time operating systems," Proceedings of the 1st IEEE/ACM/IFIP International Conference on Hardware/Software Codesign and System Synthesis, pp. 45-51, Oct. 2003.
Maneesh Soni, Thomas Mauer, Pratheesh Gangadhar, "Profibus on AM335x and AM1810 Sitara ARM Microprocessors," Whitepaper, Texas Instruments, 12 pages, Nov. 2011.
Maneesh Soni, "EtherCAT on Sitara AM335x ARM Cortex—A8 Microprocessors," Whitepaper, Texas Instruments, 14 pages, Nov. 2011.
2nd Notification of Reexamination issued Apr. 10, 2020 in counterpart Chinese Application No. 201480041254.6 (with English language translation), 25 pages.
"A Flexible Solution for Industrial Ethernet," Altera Corporation Whitepaper, Nov. 2010, 14 pages.

FIG. 2

FIG. 7
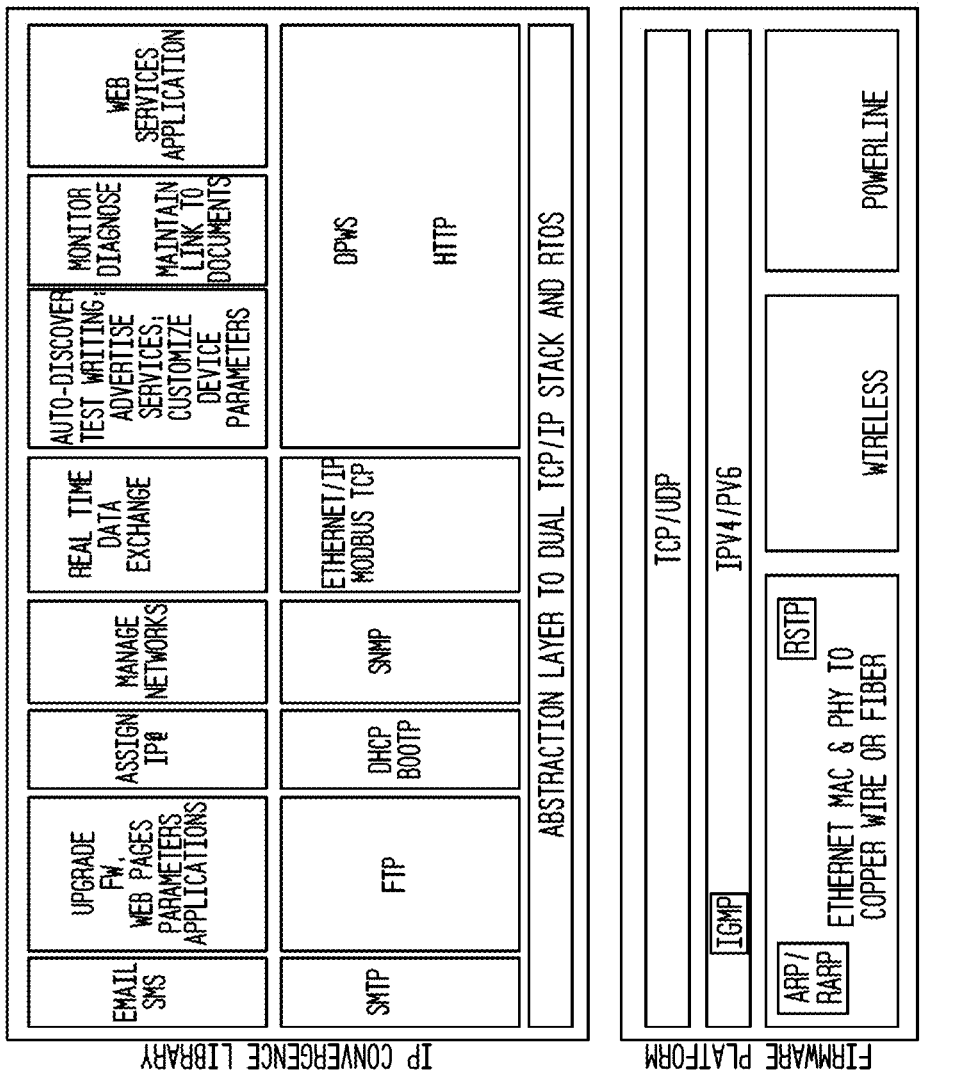
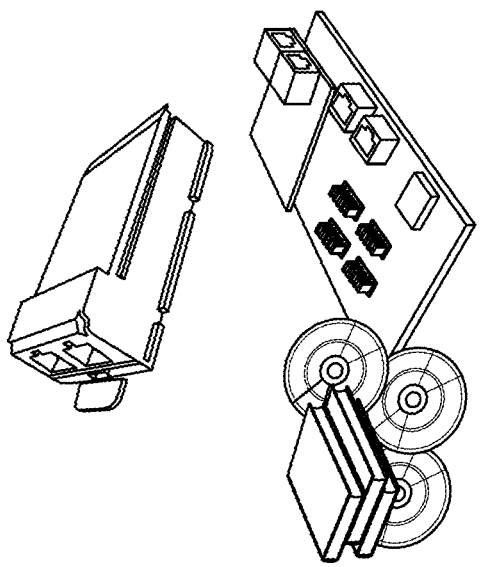

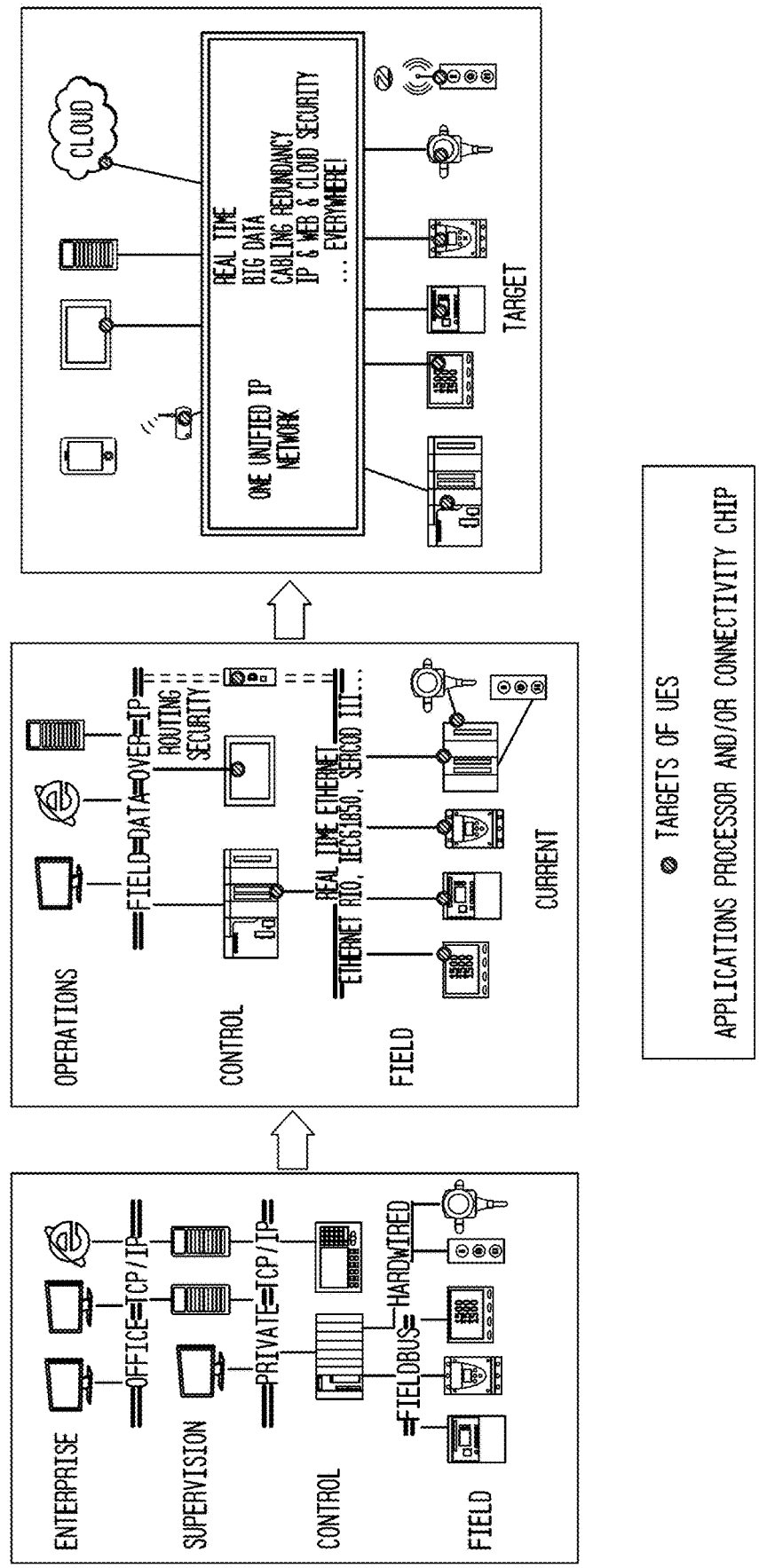

UNIVERSAL ETHERNET SOLUTION

RELATED APPLICATIONS

This application is a continuation of application Ser. No. 14/895,544, which was filed pursuant to 35 U.S.C. § 371 as the national stage of PCT International Application No. PCT/IB2014/002113, which claims the benefit of U.S. Provisional Application No. 61/837,022, filed Jun. 19, 2013, each of which is incorporated herein by reference in its entirety.

BACKGROUND

The present disclosure relates generally to industrial networks and, more particularly, to an integrated circuit that supports, among other things, multiple industrial Ethernet protocols, fieldbus protocols, and industrial application processing, thereby providing a single hardware platform that may be used to build various automation devices/equipment implemented in an industrial network (thus providing for an Application Specific Standard Product (ASSP)).

Industrial automation/control systems are employed for controlling operation of a wide variety of systems, including processes, machines, etc., and are typically adaptable to different control applications through configuration and interconnection of multiple control system components or devices, such as control modules, I/O modules, I/O devices, etc. Existing industrial control systems typically include a processor running or executing a control program to interact with an I/O system (e.g., typically one or more I/O modules or devices) to receive system information in the form of analog and/or digital inputs from field sensors and to provide outputs (analog and/or digital) to one or more actuators. Industrial control systems are increasingly being interconnected with management information and other systems in a manufacturing facility, and may be operatively connected to any number of communications networks to facilitate various business management functions such as inventory control, accounting, manufacturing control, etc., in addition to the process/machine control functionality.

The desire to integrate the business and control network structures to interconnect industrial control systems with general purpose systems, along with the evolution and development of fast Ethernet (e.g., in switch mode with full duplex capability), has allowed for Industrial Ethernet networks (e.g., such as Ethernet/IP networks that allow for direct connection of field devices to an Ethernet network) to be widely used in industrial applications. Indeed, Industrial Ethernet is becoming the dominant (if not incumbent) technology in industrial automation.

But the large number of Industrial Ethernet protocols (e.g., corresponding to the wide variety of fieldbus protocols), many of which require a specialized (e.g., non-standard) MAC design (e.g., for real-time response), presents designers and/or suppliers/vendors of industrial automation devices/components and systems (e.g., chip and board designers/vendors, device (e.g., designers/OEMs of controller, I/O modules, drives, etc.) with many technological, as well as cost, challenges associated with a device/product supporting multiple Internet Ethernet protocols.

In addition, while a variety of Ethernet/IP capable field devices (e.g., actuators, motors, valves) have become commercially available, many field devices (e.g., low-volume or specialized, and/or low-cost devices, such as low-cost sensors, etc.) may not be offered with industrial Ethernet communications capabilities because the cost of incorporating Ethernet communications functionality may be prohibitive for such devices. As such, these field devices typically provide communication using conventional industrial fieldbus networks. But connecting such fieldbus devices to Industrial Ethernet networks requires linking devices (e.g., bridges), which occupy an Ethernet network node and add to system configuration and maintenance complexity.

Thus, there remains a need for improved apparatus and methods for cost-effective and efficient support of multiple Industrial Ethernet protocols.

SUMMARY OF SOME ILLUSTRATIVE EMBODIMENTS

Some embodiments of the present invention provide an integrated circuit that supports, among other things, multiple industrial Ethernet protocols, fieldbus protocols, and industrial application processing, thereby providing a single hardware platform that may be used to build various automation devices/equipment implemented in an industrial network, such as controllers, field devices, network communication nodes, etc.

In some embodiments, a monolithic integrated circuit comprises: at least one application processor core operable to execute an industrial application and Ethernet connectivity/management code, including standard Ethernet connectivity/management code and industrial Ethernet connectivity/management code; a real time processing module configured to support a plurality of industrial Ethernet data link layers; an interface configured to be coupled to an external non volatile (e.g., Flash) memory from which the at least one application processor is configured for execute in place processing; and on-chip RAM having a capacity sufficient to eliminate the need for external RAM in execution by the at least one application processor core of an operating system, the industrial application, and the Ethernet connectivity/management code. In some implementations, the monolithic integrated circuit does not include on-chip Flash memory.

Some embodiments provide a monolithic integrated circuit comprising: at least one processor; on-chip RAM configured to be operable as main execution memory for execution by the at least one processor of (i) industrial application code, and (ii) Ethernet connectivity/management code, including a plurality of industrial Ethernet stacks corresponding to respective industrial Ethernet protocols; circuitry that is configured to support data link layer for each of the plurality of industrial Ethernet protocols; and circuitry configured to support legacy fieldbus protocols. At least one of the at least one processor may be configured to execute in place from an external non volatile memory at least one of (i) the industrial application code, (ii) at least a portion of the Ethernet connectivity/management code, and (iii) an operating system. In some implementations, the monolithic integrated circuit does not include on chip flash memory, and optionally, the monolithic integrated circuit does not include any on-chip nonvolatile memory used for storing any one or more of (i) the industrial application, (ii) the Ethernet connectivity/management code, and (iii) the operating system.

Some embodiments provide an industrial network comprising: at least one field device comprising a monolithic integrated circuit according to any of the illustrative embodiments summarized above; at least one automation control unit comprising a monolithic integrated circuit according to any of the illustrative embodiments summarized above; and at least one operator unit having an operator interface comprising a monolithic integrated circuit according to any of the illustrative embodiments summarized above. The at least one field device may comprise at least one of an input/output unit, a sensor, and an actuator. The at least one control unit may comprise at least one of a programmable logic controller, programmable automation controller, a communication module, and a drive. The at least one operator unit may comprise at least one of a human machine interface (HMI) device and a SCADA computing device.

Some embodiments provide a method for executing an industrial application and Ethernet connectivity/management code, including standard Ethernet connectivity/management code and industrial Ethernet connectivity/management code, by at least one application processor core of a monolithic integrated circuit, the monolithic integrated circuit comprising: a real time processing module configured to support a plurality of industrial Ethernet data link layers; an interface configured to be coupled to an external non volatile (e.g., Flash) memory from which the at least one application processor is configured for execute in place processing; and on-chip RAM; the method comprising utilizing the on-chip RAM as main execution memory for execution by the at least one application processor core of an operating system, the industrial application, and the Ethernet connectivity/management code.

For ease of reference, the present disclosure uses the term UES (Universal Ethernet Solution) to refer to some embodiments of such an integrated circuit. In addition, for convenience and ease of reference, the term "data segment" (or, in certain contexts, the term data) is used herein to refer generally to the initialized data segment and the uninitialized data segment (e.g. BSS) memory space portion associated with a program, these segments comprising static variables and global variables. Similarly, for convenience and ease of reference, each of the terms "non-code segment," "user data," and "process data" is used herein to refer collectively to the data segment, the stack, and the heap memory space portions associated with execution of a program. Further, the term "standard Ethernet" is used herein, where desired, to expressly refer to Ethernet that is not subject to a hard real-time constraint, while the general term "Ethernet" may refer any Ethernet protocol, whether or not subject to a hard real-time constraint, unless the context clearly dictates otherwise.

In addition, throughout the description and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, as used herein, the term "coupled" refers to directly connected or to indirectly connected through one or more intermediate components and, in some contexts, may also denote or include electrically coupled, such as conductively coupled, capacitively coupled, and/or inductively coupled.

It will be appreciated by those skilled in the art that the foregoing brief summary and following description are exemplary (i.e., illustrative) and explanatory of some embodiments of the present invention, but are neither representative nor inclusive of all subject matter and embodiments within the scope of the present invention, and are not intended to be restrictive of the present invention or limiting of the advantages which can be achieved by the present invention in various implementations. Thus, the ensuing description, together with the accompanying drawings, constituting a part hereof and some of which are referred to herein, serve to explain and illustrate some embodiments of the present invention as well as principles of some embodiments.

BRIEF DESCRIPTION OF THE DRAWINGS

Aspects, features, and advantages of some embodiments of the invention, both as to structure and operation, will be understood and will become more readily apparent in view of the following description of non-limiting and non-exclusive embodiments in conjunction with the accompanying drawings, in which like reference numerals designate the same or similar parts throughout the various figures, and wherein:

FIG. 2 schematically depicts an illustrative high-level architecture of a UES chip, representing a low-cost Ethernet Solution, in accordance with some embodiments of the present invention;

FIG. 7 depicts, by way of non-limiting example, all of the services available in an illustrative IPCL library;

FIG. 8 represents the evolution of industrial network architectures and how a UES according to some embodiments enables the further evolution of industrial network toward an IP-centric network, thereby illustrating an IP-centric network in accordance with some embodiments;

DESCRIPTION OF ILLUSTRATIVE EMBODIMENTS

Figure 1:
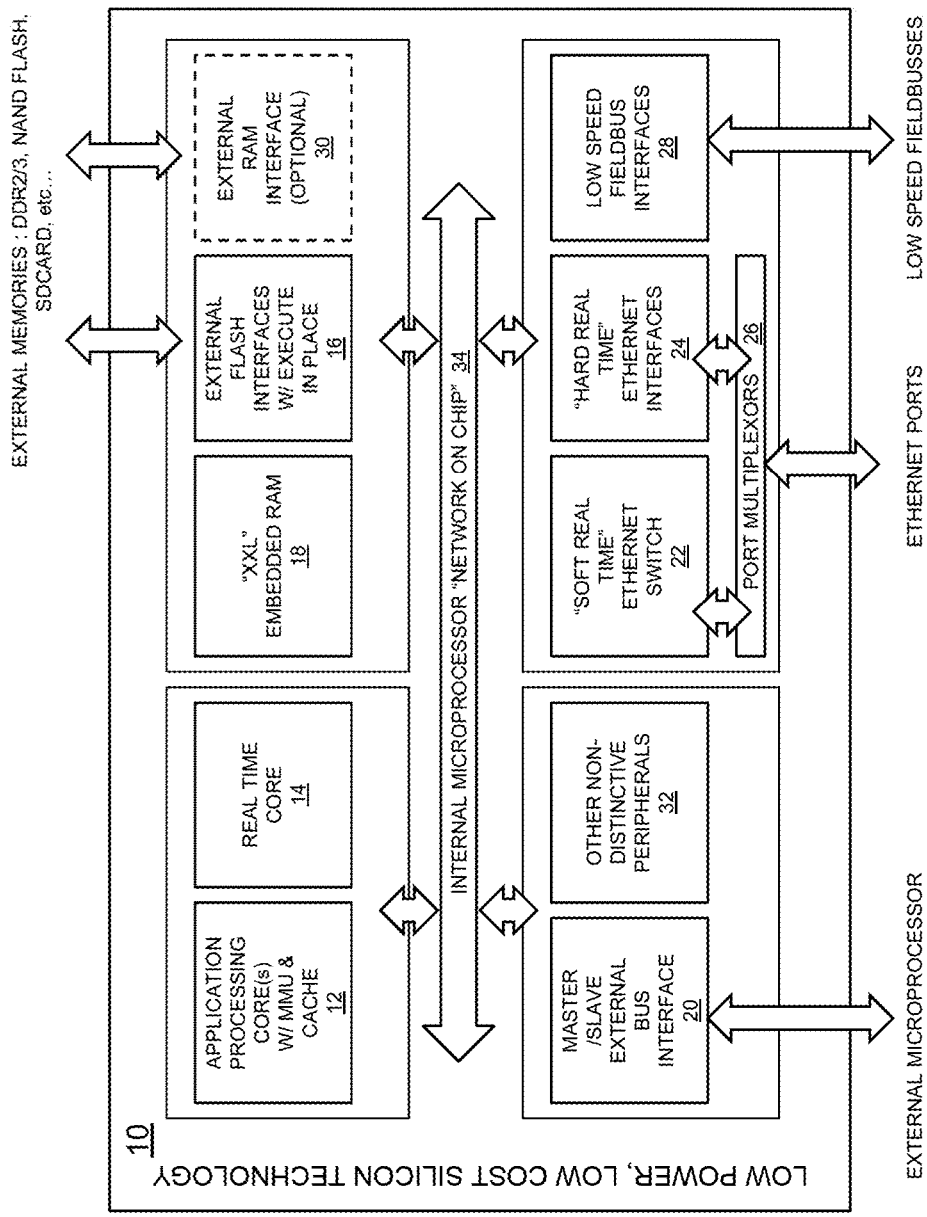
FIG. 1 schematically depict a block diagram of a UES integrated circuit chip, in accordance with some embodiment.

As shown in FIG. 1, a UES integrated circuit chip 10 according to some embodiments may be implemented in, for example, a low-power, low-cost silicon technology and may include the following monolithically integrated components: one or more application processor cores 12 operable to execute an industrial application and Ethernet connectivity/ management code (e.g., firmware), including industrial Ethernet connectivity/management code; a real-time processing module 14 (e.g., including a core) configured to support an industrial Ethernet data link layer (and, generally, multiple industrial Ethernet data link layers); an interface 16 to external non-volatile (e.g., Flash, F-RAM, MRAM, etc.) memory from which the UES is configured for execute-in-place (XIP) processing; on-chip RAM 18 having a capacity sufficient to eliminate the need for external RAM in execution by the application processor core(s) of an operating system, the industrial application, and the Ethernet connectivity/management code; a master/slave external bus interface 20 configured to provide for direct master/slave communications with another microprocessor (e.g., another UES); a "soft real-time" Ethernet switch 22, "hard real-time" Ethernet interfaces 24, port multiplexor(s) 26, and low-speed fieldbus/comms interfaces 28. The Ethernet switch, Ethernet interfaces, and low-speed fieldbus/comms interfaces may include a physical layer (PHY) for each of the Ethernet protocols (i.e., standard Ethernet and industrial Ethernet) and the fieldbus/comms.

In the illustrative embodiment, UES does not include on-chip Flash memory. UES may also include an external RAM interface 30, which is typically optional based on the capacity of the on-chip RAM.

As indicated, for example, in the drawings, UES embodiments may include many additional peripherals 32, such as but not limited to timers/counters, RTC, an Interrupt Controller, basic serial interfaces (e.g., SPI, UART, I²C), a trace and debug unit, as well as additional peripherals that may be typically included with any core in any MCU/MPU. The illustrative UES embodiments also include on-chip ROM (e.g., 32 kBytes) which may store the boot code. As schematically depicted, in the illustrative embodiment, Network-on-Chip (NoC) 34 manages on-chip communications and dataflow among the various on-chip functional modules/ cores, etc.

Some illustrative aspects and/or value associated with these various features/components as monolithically integrated in some embodiments (e.g., FIG. 1) may be summarized a follows:

| Feature | Value |
| --- | --- |
| Low Power, Low Cost Silicon Technology | Large scale integration, low cost, low power consumption while maintaining endurance |
| Application Processing Cores | Combine Ethernet management function with main product's application to save cost, power; and increase application and Ethernet consistency |
| Real Time Processing Core | Execute auxiliary critical tasks (fieldbus management, safety checker, . . . ) |
| "XXL" Embedded RAM + Execute-in-Place (XiP) Capability from External Flash | Prevent use of external RAM - Large enough to execute a complex Operating System like Linux or VxWorks Allows a more efficient silicon technology, with respect to embedded Flash approaches |
| Optional External RAM Interface | Provides enough room for larger applications not fitting in internal RAM |
| Master/Slave External Bus Interface | System can be used in conjunction with another microprocessor |
| "Soft Real-Time" Ethernet Switch | Connection to generic Ethernet "IT" networks with multiple topologies |
| "Hard Real-Time" Ethernet Interfaces | Connection to specific industrial Ethernet based networks |
| Port Multiplexors | Flexible product usage depending on installation requirements |
| Low-Speed Fieldbus/ Comms Interfaces | Compatibility with installed bases. Connection to external wireless transceivers |

As will be understood by those skilled in the art, the combination of these elements in a single integrated circuit, in accordance with some embodiments such as the illustrative embodiment of FIG. 1, is unique and provides for a low cost Multi-protocol Ethernet Solution. It will be further understood by those skilled in the art that such an integrated circuit according to some embodiments provides an Application Specific Standard Product (ASSP) well-suited for building equipment/devices at different tiers of an industrial automation system.

Figure 2:
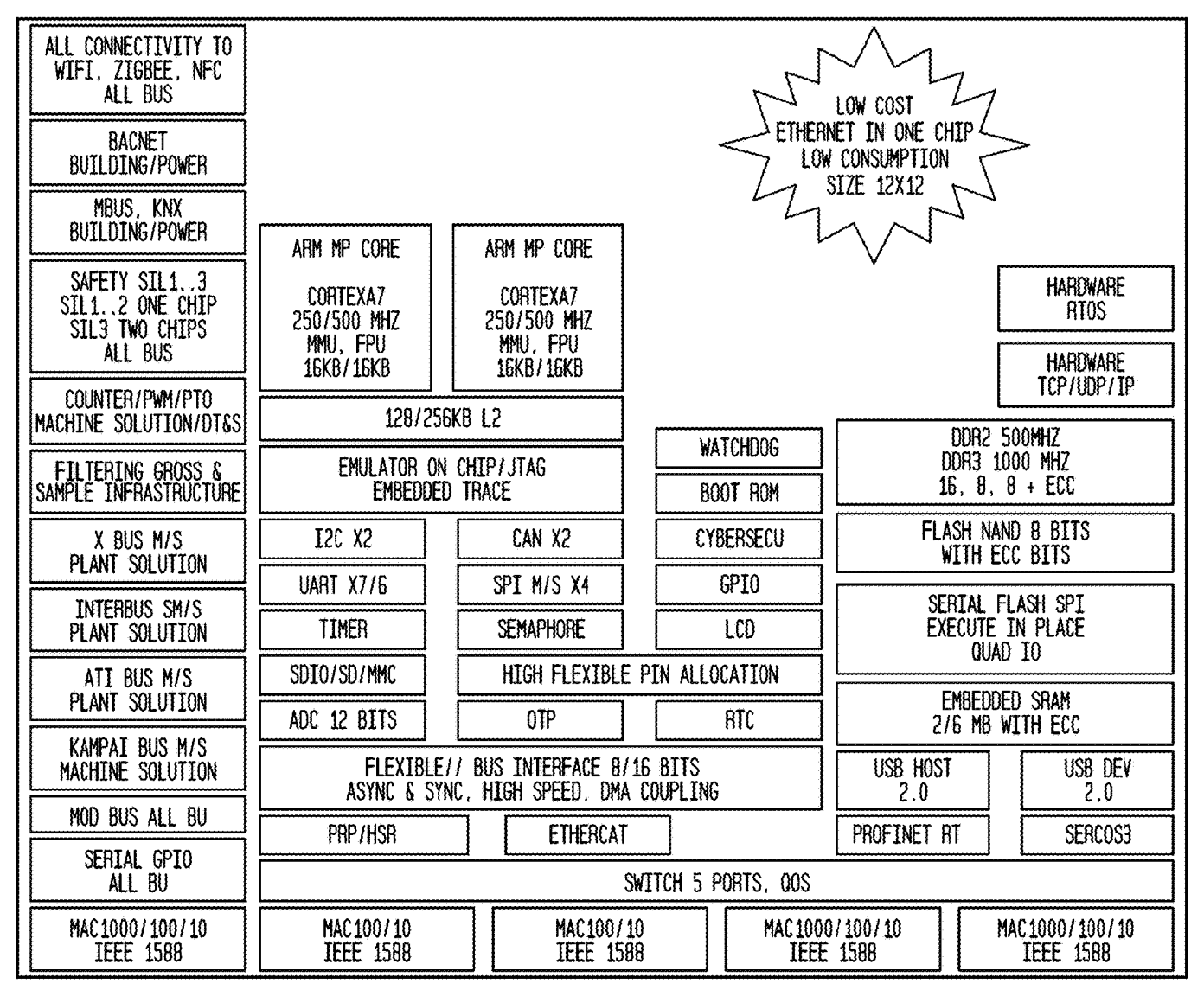

By way of further example, FIG. 2 schematically depicts an illustrative high-level architecture of a UES chip, representing a low-cost Ethernet Solution, in accordance with some embodiments of the present invention. As depicted, among other features (e.g., very low consumption; e.g., 200-500 mW thermal design), the UES supports multiple Industrial Ethernet and realtime protocols (e.g., Sercos3, Ethercat, Profinet RT, IEEE 1588, etc.), as well as various proprietary and/or legacy buses and features (e.g., Xbus, Kampai bus, Sgpio, Pwm/Pto, LonWorks, etc.).

Figure 3:
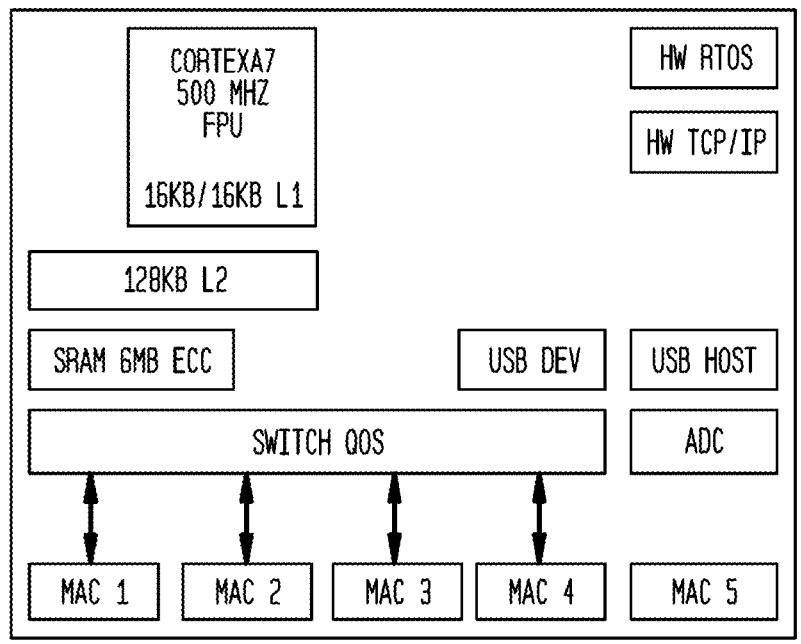
FIG. 3 depicts an illustrative version of a UES chip in accordance with some embodiments.
Figure 4:
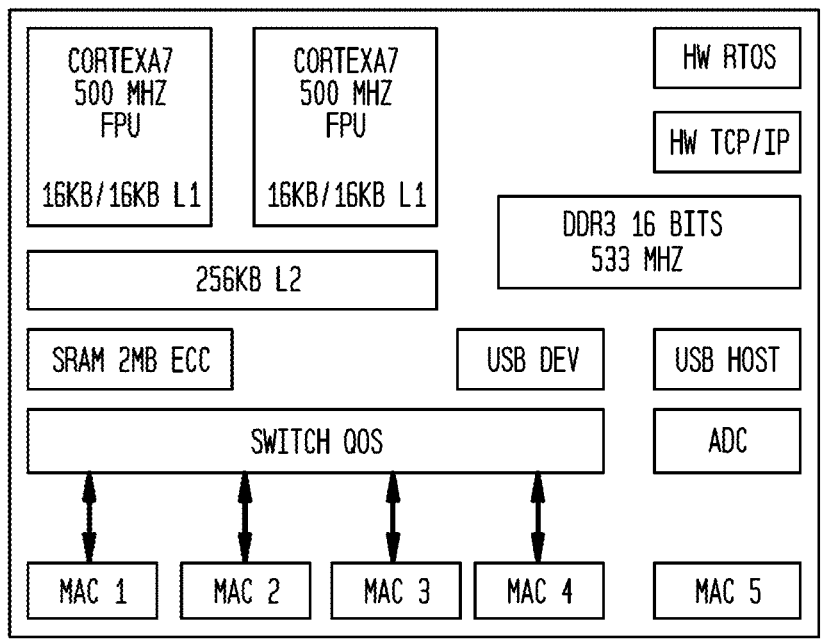
FIG. 4 depicts an illustrative version of a UES chip, in accordance with some embodiments.

Two illustrative versions (e.g., implementations) of a UES in accordance with the embodiments of FIGS. 1 and 2 are shown in FIGS. 3 and 4. More specifically, FIG. 3 depicts an illustrative UES that employs a single Cortex A7 core and a 6 MB SRAM, whereas FIG. 4 depicts an illustrative UES that employs dual Cortex A7 cores and a 2 MB SRAM. As further discussed below, each of these embodiments, like the embodiment of FIG. 2, may optionally also include a Cortex M3 core.

Additional aspects of some embodiments of the illustrative UES components according to some embodiments (e.g., FIGS. 1-4) are further described as follows.

Processor Core(s)

As shown (e.g. FIGS. 2-4), each application processing core (e.g., processing core(s) 12) may be implemented using an ARM® processor core, such as the ARM® Cortex™ A7 microprocessor core. In some embodiments (e.g., FIGS. 2 and 4), UES may comprise dual ARM Cortex-A7 processors, capable of together providing UES performance of up to at least about 1900 DMIPS (Dhrystone MIPS) at 500 MHz CPU operation.

Figure 5:
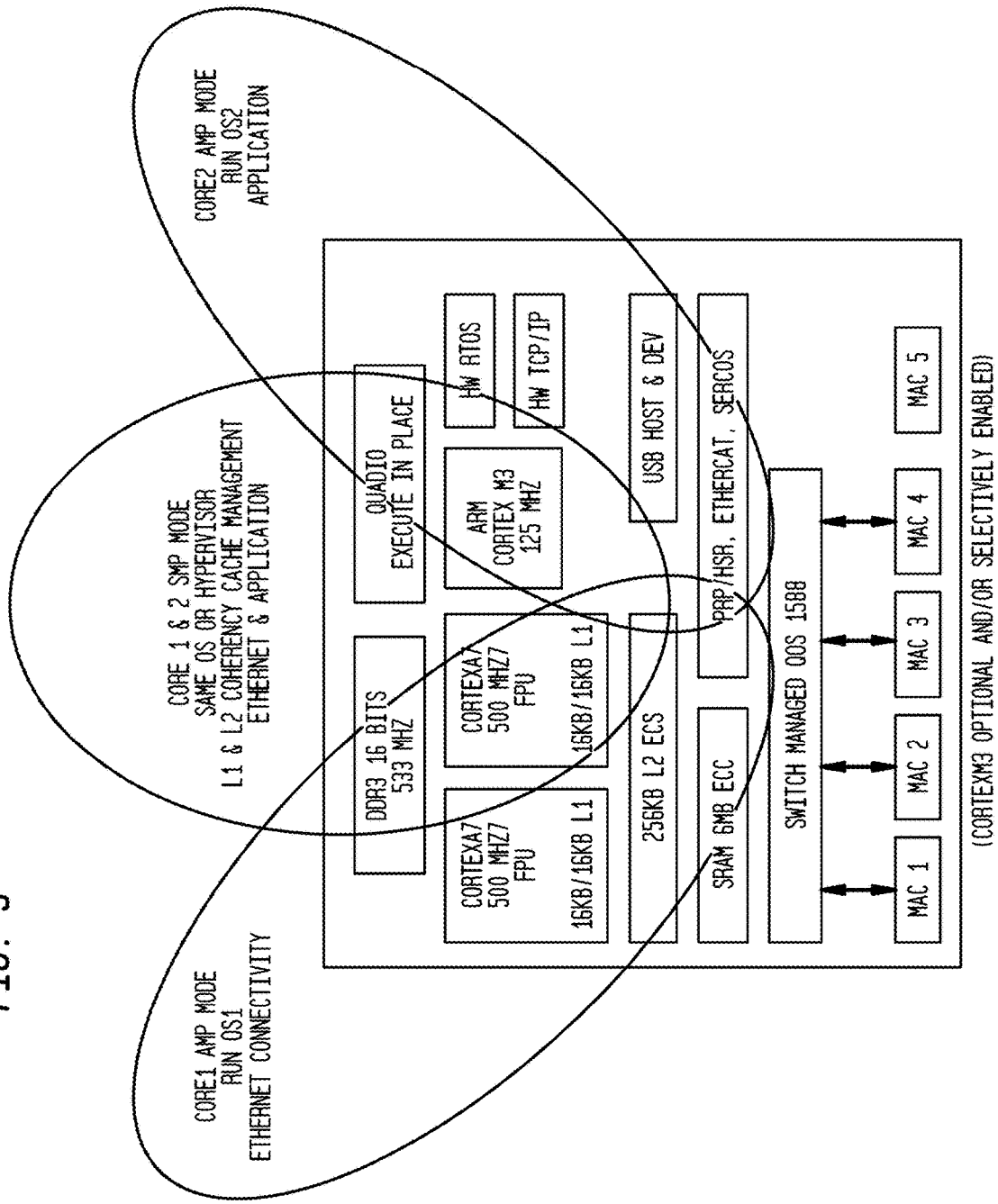
FIG. 5 schematically depicts an illustrative UES comprising two Cortex A7 cores, in accordance with some embodiments.

UES is configured to run any of a variety of operating systems and, in multicore implementations (e.g., the illustrated dual-core embodiments of FIGS. 2 and 4), the multiprocessing execution environment may be implemented in any of the following modes for running the industrial application code and the Ethernet connectivity/management (e.g., industrial Ethernet stack) code processes: asymmetric multiprocessing (AMP), either homogeneous or inhomogenous; symmetric multiprocessing (SMP); and bound multiprocessing (BMP). By way of illustration, FIG. 5 schematically depicts an illustrative UES comprising two Cortex A7 cores, wherein (i) both cores may run in SMP mode under the same OS or under a hypervisor to run application code and the Ethernet connectivity/management, and/or (ii) the cores may each run in AMP mode under respective OSs to respectively execute Ethernet connectivity/management and application code.

Real-time Processing Module (e.g., Real-time Processing Core)

UES may include a real-time processing module that may comprise hardware (e.g., dedicated hardware and/or a processor core (and associated firmware)) that supports real-time Ethernet protocols and/or any other critical tasks.

For example, in some embodiments, to support real-time Ethernet protocols, UES includes a real-time processing core that includes, for example, a processor core such as an ARM Cortex M3. Real-time processor core may also support additional critical tasks (e.g., fieldbus management, safety checker, etc.). Dedicated hardware engines may also be employed to reduce the load on the real-time processor core CPU (e.g., the Cortex M3). For example, such hardware engines may include a hardware real-time operating system accelerator (HW-RTOS) and may also include a Hardware Ethernet Accelerator (HW-EA; e.g., supporting IP/TCP/UDP Check Sum, Header ENDEC, Buffer management, etc.).

It will be understood, however, that some embodiments may not include a dedicated real-time processor core CPU (e.g., ARM Cortex M3), or may selectively disable its operation, or may selectively disable its operation in executing real-time Ethernet protocols. For example, in some such embodiments, one application processor core can run a real time Ethernet protocol, either through the additional MAC, the soft real time Ethernet switch or dedicated hard real time Ethernet resources, without HW-RTOS or HW-EA assistance.

Also by way of example, in various alternative embodiments where a real-time processor core CPU is not employed, UES may be configured such that the processor core(s) (or at least one of the cores) that run(s) the industrial application programming may also run the real-time Ethernet protocols (e.g., including management of the data link layer (e.g., MAC)), but with support from hardware engines such as the HW-RTOS and the Hardware Ethernet Accelerator (HW-EA).

Alternatively or additionally, in some embodiments where a real-time processor core CPU is not employed, an additional on-chip MAC engine (e.g., additional dedicated hardware/logic/control) may be provided that cooperates (e.g., via the system bus) with the HW-RTOS and HW-EA to support real-time Ethernet protocols and/or any other critical tasks.

As indicated, in some embodiments that employ a real-time processor core, the real-time processor core may also support additional functions, such as being operable in supporting a safety checker. In some implementations, for various tasks or processes, so-called "safety checker" code run by the real time core performs the same function as "safe" parts of the application core. One or the other of the core (either the safety checker core or application core) is in charge of checking that both codes provide the same calculation results for a given task before applying those calculated results to actuators (i.e., in the event that they do not match, the calculated results will not be applied).

In addition, in some embodiments, another entity not shown in the diagrams but generally located in the Network On Chip 34 or at its boundaries, is in charge of checking that each and every master (e.g., which could be a core, or an Ethernet MAC, or a USB peripheral, etc) accesses only the slaves and the memory regions it is intended to access. This entity is very similar to a MMU but at the level of the entire chip instead of being at the level of one core.

Such a safety checker and memory access control, as supported by the real-time processing core, may provide for achieving SIL2 certification (as per the IEC61508 standard) on a single chip, while keeping a standard Operating System in the application processing core(s). In some embodiments, a core (e.g., ARM Cortex M3) in addition to the application processing core(s) may be provided to support additional functions (e.g., safety checker, etc.), but may not be configured to support real-time Ethernet protocols.

On-Chip Main Memory

As indicated above, in accordance with some embodiments, UES includes on-chip RAM having sufficient capacity to eliminate the need for external RAM in execution by the application processor core(s) of an operating system, the industrial application, and the Ethernet connectivity/management code. In other words, in some embodiments, UES includes sufficient on-chip RAM configured as main execution memory (e.g., not cache) such that external RAM is not required to satisfy main memory requirements for executing all Ethernet services, industrial application programming, and operating system(s). In various embodiments, one or more of these programs may be stored in, and executed-in-place from, the external non-volatile memory (e.g., external Flash, which by way of non-limiting example, may in some implementations be interfaced to UES via a Quad SPI able to provide up to about 50 MBps bandwidth).

The on-chip RAM may be configured to (i) store at least the changeable process data (e.g., the uninitialized data segment or so-called BSS and the stacks and the heaps) associated with execution of the operating system, the industrial application, and the Ethernet connectivity/management code, and (ii) not store code (i.e., no allocation of code/text segment) associated with each of the operating system, the industrial application, and the Ethernet connectivity/management code that is configured for execution-in-place from the external non-volatile memory.

It will be understood, however, that in some embodiments, as a practical matter, some code typically will be stored in and executed from the on-chip RAM, such as one or more of the following: (i) performance and latency critical code, such as the real-time processor code (e.g., particularly in implementations where the real-time processor has no cache); (ii) self-modifying code (e.g. the user defined portion of industrial application usually written in Ladder logic for instance); and (iii) code whose execution purpose is not compatible with XIP; for instance, erase/write routines for the flash.

Non-changeable process data (e.g., initialized data segment) associated with each of the operating system, the industrial application, and the Ethernet connectivity/management code that is configured for execution-in-place from the external non-volatile memory may—or may not—be stored in the on-chip RAM, in accordance with various embodiments. For instance, in some embodiments, for each of the operating system, industrial application, and Ethernet connectivity/management code that is configured to be executed-in-place from the external non-volatile memory, the on-chip RAM stores neither the associated initialized data segment nor the associated code. But in some embodiments, for example, for at least one of the operating system, industrial application, and Ethernet connectivity/management code that is configured to be executed-in-place from the external non-volatile memory, the on-chip RAM stores the associated initialized data segment and does not store the associated code.

In various embodiments, the on-chip RAM may be implemented as SRAM or as any other RAM technology that can be monolithically integrated on the UES (e.g., embedded DRAM). In accordance with various illustrative embodiments, on-chip RAM may have a capacity of about 2 MB, or about 4 MB, or about 6 MB. While in some embodiments additional capacity may be provided (e.g., more than about 6 MB, such a 10 MB, or 20 MB, etc.), the provision of additional on-chip RAM should be considered in view of design requirements and tradeoffs, such as performance, technology node (e.g., 40 nm, 15 nm), cost, desired modules/engines/peripherals, allocation of chip real estate, etc. For instance, as may be appreciated, basic operating system services and a TCP/IP stack may typically require 1 to 2 MB of data, and an array of Ethernet services, including but not limited to HTTP, FTP, SNMP, plus a few application layer protocols may typically require an additional 2 to 3 MB.

Figure 6:
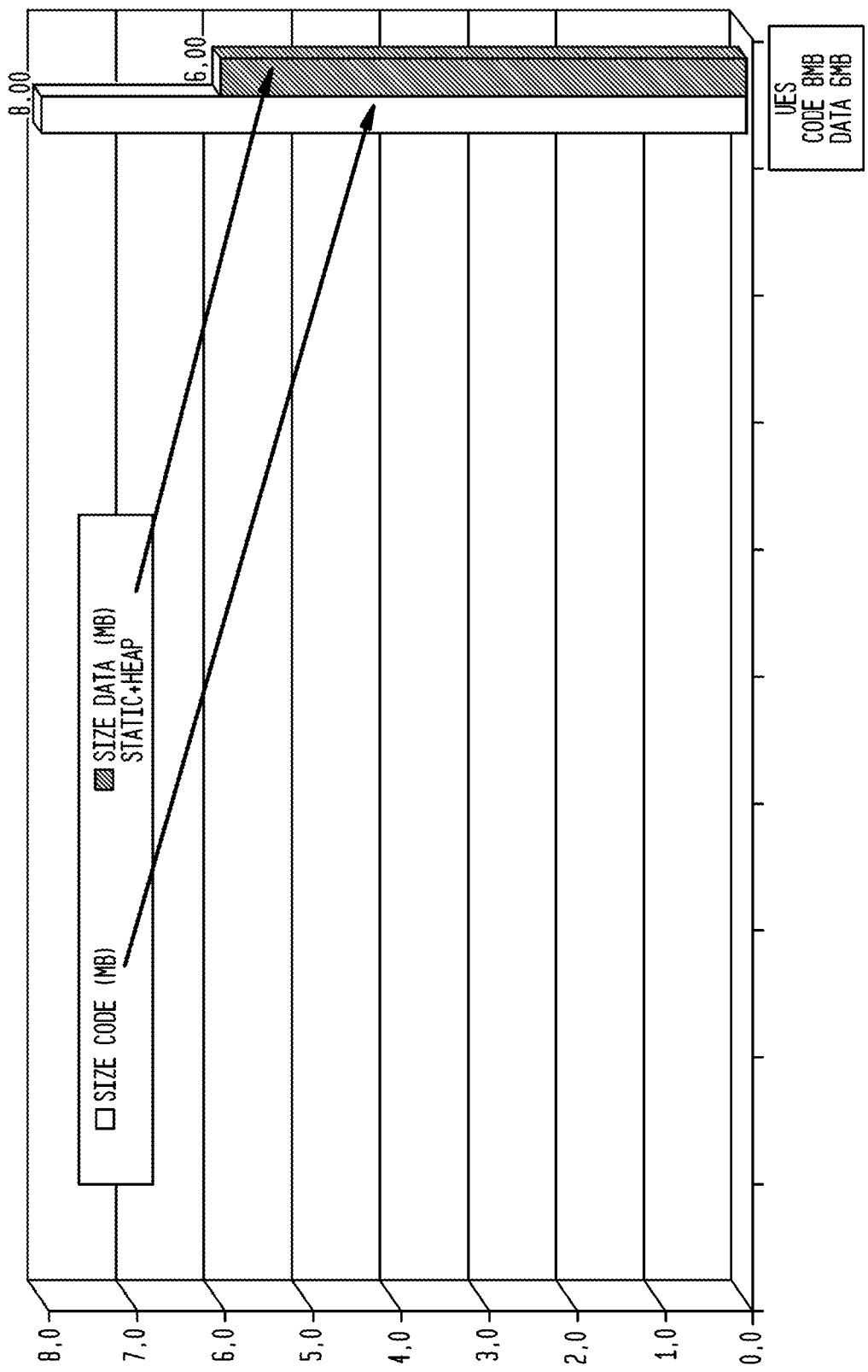
FIG. 6 is an illustrative graph showing illustrative memory requirements for all Ethernet services of an illustrative available IPCL library, in accordance with some embodiments.

A more specific illustrative example consonant with such requirements is indicated in FIG. 6, illustrating that all Ethernet services of an illustrative available IPCL library (IPCL being a process control language developed by the present assignee/applicant; services available in an illustrative IPCL library being illustrated in FIG. 7) would require nearly 14 MB of code and data memory allocation, but can be accommodated with 6 MB of RAM and execute-in-place (XIP) operation.

It will be understood, therefore, that in some embodiments, such as the single A7-core embodiment illustrated in the figures (e.g., FIG. 3), the on-chip RAM (e.g., 6 MB) may be the only RAM for the system; as such, it hosts data, stack, and heap for all software elements (e.g., OS, Ethernet protocol, industrial application) for the application core(s) (e.g., the single A7 core) as well as for the real-time core (e.g., Cortex M3). In various such implementations, the Ethernet protocol may be executed by either the application processing core (e.g., A7) or the real-time core (e.g., M3). While code for the A7 is typically executed-in-place, in various implementations, some code such as critical code for some routines (e.g., flash upgrade code) may be copied to the on-chip RAM.

It will also be understood, therefore, that in some embodiments, such as some implementations of the dual A7 core with 2 MB of on-chip RAM embodiments illustrated in the figures (e.g., FIGS. 2 and 4), the on-chip RAM may host the code and data of the real-time core, as well as some time-critical code and data of at least one of the A7 cores, while an external RAM may be provided to host at least data associated with additional applications executed (e.g., executed in place) by one or more of the A7 cores. In various implementations, code for one or more of the application processor core(s) (e.g., the A7s) may be either executed in place or copied to external RAM, while, as noted, code for some routines (e.g., wake-up code) executed by one or more of the application processor cores may be copied to the on-chip RAM.

As indicated above, the illustrative UES embodiments discussed herein and illustrated in the figures do not include on-chip flash memory, allowing for chip real estate to be used for additional RAM and/or additional circuitry, without requiring the use of a smaller technology node. It will be understood, however, that in some implementations (e.g., using a smaller technology node) it may be advantageous to include at least some on-chip flash memory (e.g., possibly for OS kernel).

As understood by those skilled in the art, conventional microcontroller units (MCUs) and microprocessor units (MPUs) generally do not provide—and are not configured to provide-sufficient on-chip RAM to act as the main execution memory for execution by the MCU or MPU of an operating system, an industrial application, and Ethernet connectivity/management code as provided by embodiments of the present disclosure.

In addition, as recognized by the present inventors, eliminating external DRAM by providing on-chip RAM as the main execution memory provides distinct advantages for industrial automation equipment solutions, not only with respect to power dissipation and memory bandwidth, but also with respect to thermal design. More specifically, the environment in which industrial automation equipment is deployed, and the temperature sensitivity of DRAMs, requires providing stringent temperature control of the external DRAM integrated circuit in addition to the temperature control of the MPU integrated circuit. By eliminating the requirement for external DRAM, UES significantly reduces the technical complexity, as well as associated cost, associated with separately controlling the temperature of an external DRAM. While illustrative UES embodiments are configured for interfacing with an external Flash memory, Flash memory dissipates less heat than DRAM and, therefore, does not require stringent temperature control. In addition, external Flash is generally easier to implement; for example, unlike DRAM, it does not require stringent board routing rules.

Accordingly, in view of the foregoing illustrative embodiments of a UES integrated circuit, those skilled in the art will understand that, for example, in combining Application Processing, Ethernet switching, Fieldbus, and memory in the illustrative manner described, embodiments of the present invention represents a new digital microprocessor concept. Further, this new concept provides for a low-cost (e.g., cost-effective) Ethernet solution, well-suited for implementing not only in controllers, but also in field devices (e.g., sensors, actuators, etc.). While embodiments of the present disclosure are optimally suited, or at least particularly well-suited to the present assignee/applicant's software, core networks, and operating requirements, those skilled in the art will understand that various embodiments are generally applicable and provide an ASSP (Application Specific Standard Product) that can be optimized for various devices and applications of any industrial automation/control network. Further, by bringing connectivity and ample processing performance into a large set of devices, various embodiments of a UES chip enable offering digitalization and a services-based business model.

And, in this regard, UES chips according to some embodiments of the present disclosure provide for IP convergence, as schematically illustrated by FIG. 8. As shown, UES enables the evolution of industrial network architectures from staggered/tiered architectures of legacy and current networks toward an IP-centric network, employing one unified IP network (e.g., IP can be Ethernet wired, Wifi, Zigbee, cloud, etc.). In other words by combining Ethernet, Industrial Ethernet, Legacy Fieldbus, and application processing, UES implementations according to embodiments of the present invention may be targeted to myriad devices/nodes across the network, providing performance and features for connecting any device to globalized IP networks (and, for example, keeping cost at legacy fieldbus levels).

Figure 9C:
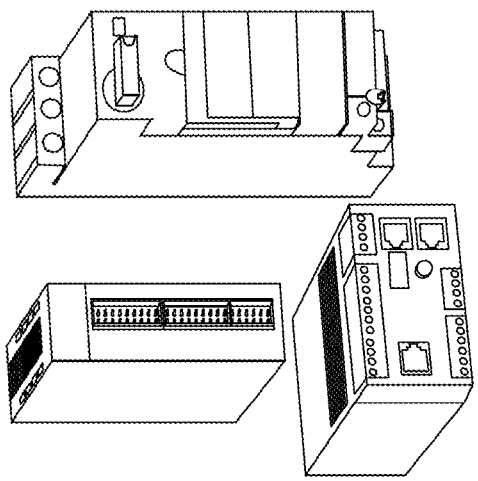
FIG. 9C schematically depicts an illustrative UES chip implemented at the device level (e.g., in intelligent I/O and field devices), in accordance with some embodiments.
Figure 9B:
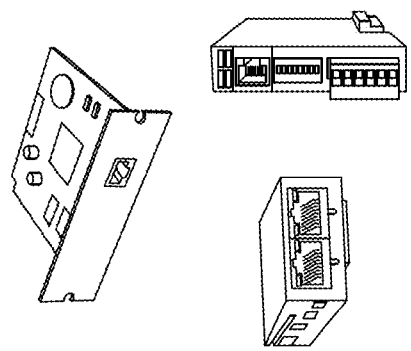
FIG. 9B schematically depicts an illustrative UES chip implemented as a coprocessor, such as in an Ethernet Option card, in accordance with some embodiments.
Figure 9A:
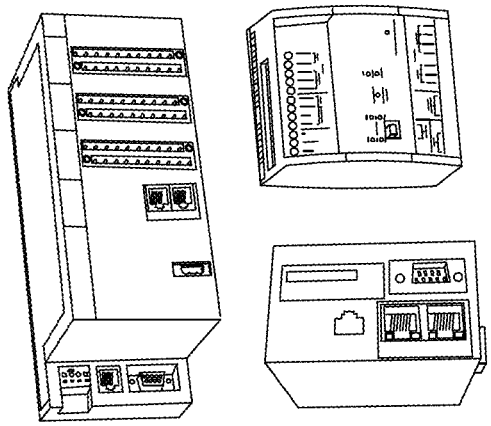
FIG. 9A schematically depicts an illustrative UES chip implemented in controllers and other intelligent devices, in accordance with some embodiments.

More specifically, as noted (and as represented in the Target network of FIG. 8), a UES in accordance with various embodiments of the present invention, is applicable to myriad applications and devices across different levels (e.g., operator, control, field) of an industrial automation/control network, including, for example, I/O devices, sensors, actuators, programmable logic controllers and industrial computers, human-machine interface (HMI), SCADA operator nodes, as well as network switches. FIGS. 9A, 9B, and 9C further illustrate three targeted implementations of a UES in accordance with some embodiments. Particularly, FIG. 9A shows that a UES may be implemented in controllers and other intelligent devices, in which a UES may manage/execute a global application as well as Ethernet and fieldbuses. In addition, as shown in FIG. 9B, a UES may be implemented as a coprocessor, such as in an Ethernet Option card, wherein the UES manages Ethernet protocols. And, as shown in FIG. 9C, a UES may be implemented at the device level (e.g., in intelligent I/O and field devices), wherein the UES may manage both backplane or fieldbus and specialized application(s). It will be understood that various UES embodiments (e.g., single core, multicore, etc.) may be implemented in different levels/devices/nodes as appropriate (e.g., with respect to cost, performance, etc.), though it is possible that identical UES versions may be used in different levels/devices/nodes.

Figure 10:
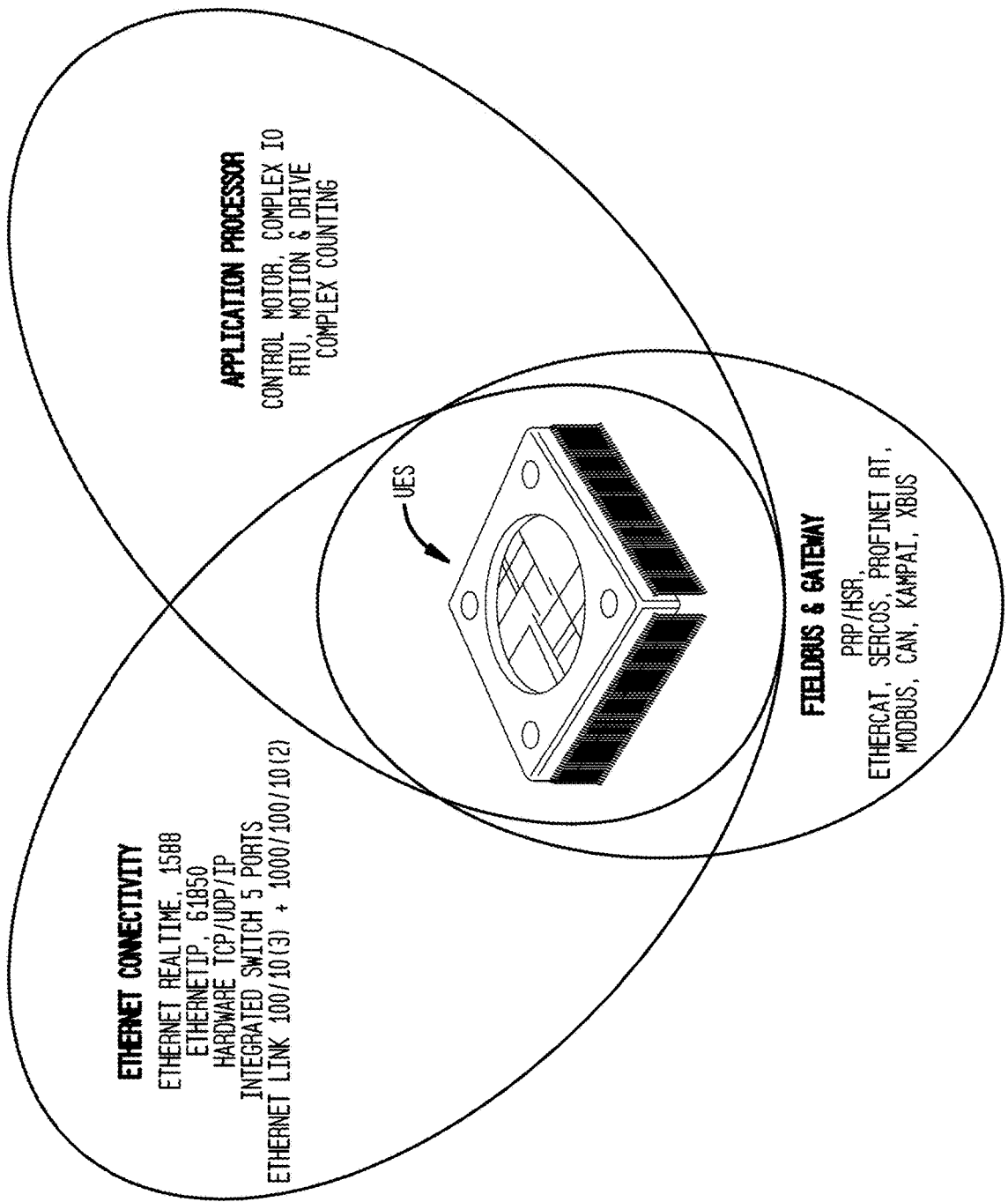
FIG. 10 schematically depicts an example of three targets integrated in the same UES chip, in accordance with some embodiments.

FIG. 10 schematically depicts an example of three targets integrated in the same UES chip, in accordance with some embodiments. As shown, the same UES chip (e.g., implemented in accordance with one of the embodiments of FIGS. 2-4) is capable of (i) supporting connectivity for multiple Ethernet protocols (Ethernet Real Time, IEEE 1588, EthernetIP, IEC 61850, etc.), (ii) supporting fieldbus and gateway protocols and addressing schemes (e.g., PRP/HSR, Ethercat, Sercos, Profinet RT, ModBus, Can, Kampai, Xbus, etc.), and (iii) acting as the application processor for any of various illustrative control device/applications (e.g., motor controller, complex I/O, Remote Terminal Unit (RTU), motion and drive applications, complex counting applications, etc.).

Figure 11:
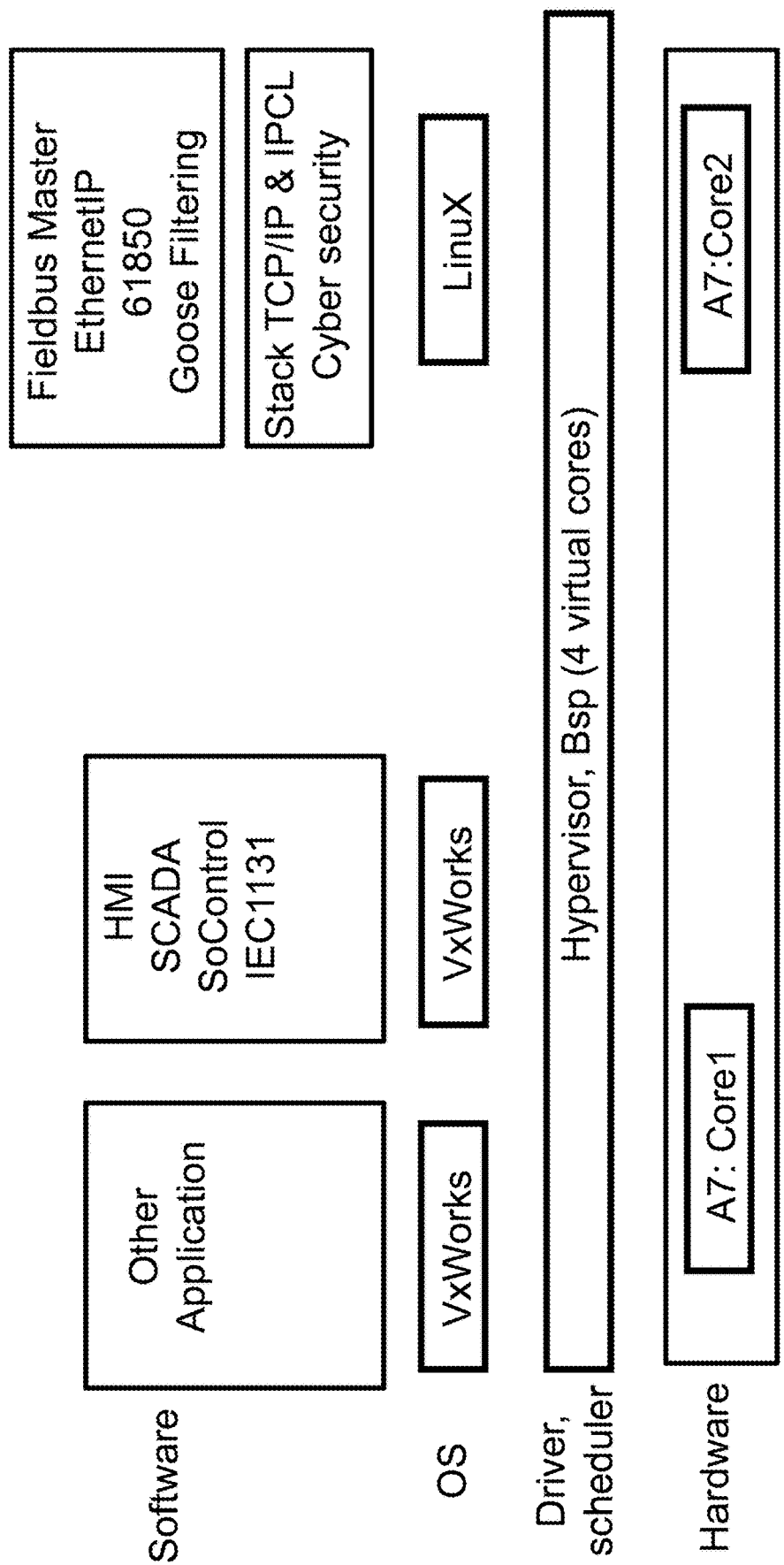
FIG. 11 shows an illustrative architecture of a UES configured for a controller application, in accordance with some embodiments.
Figure 12:
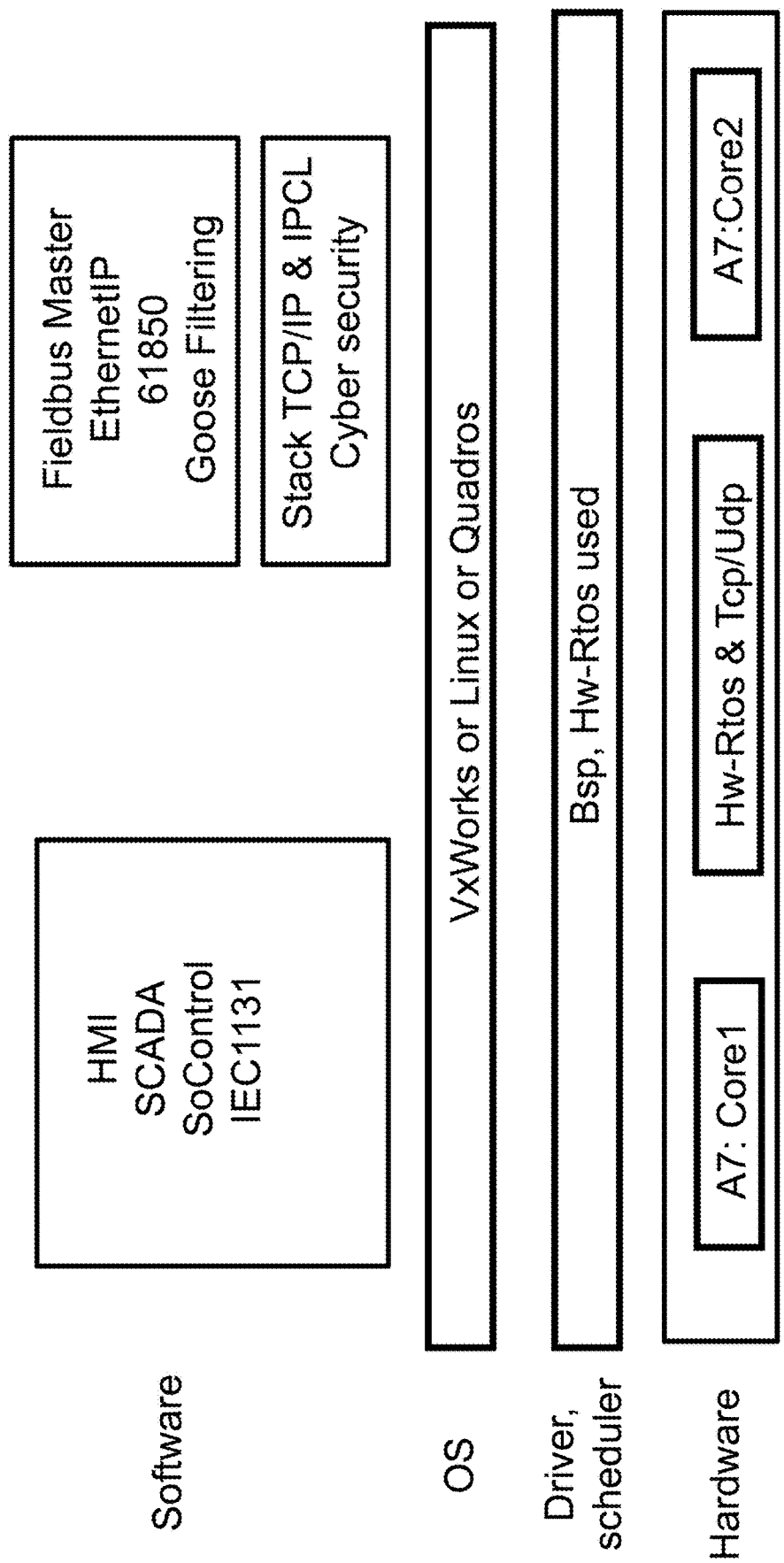
FIG. 12 shows the architecture of an illustrative UES configured for a controller and device application, in accordance with some embodiments.
Figure 13:
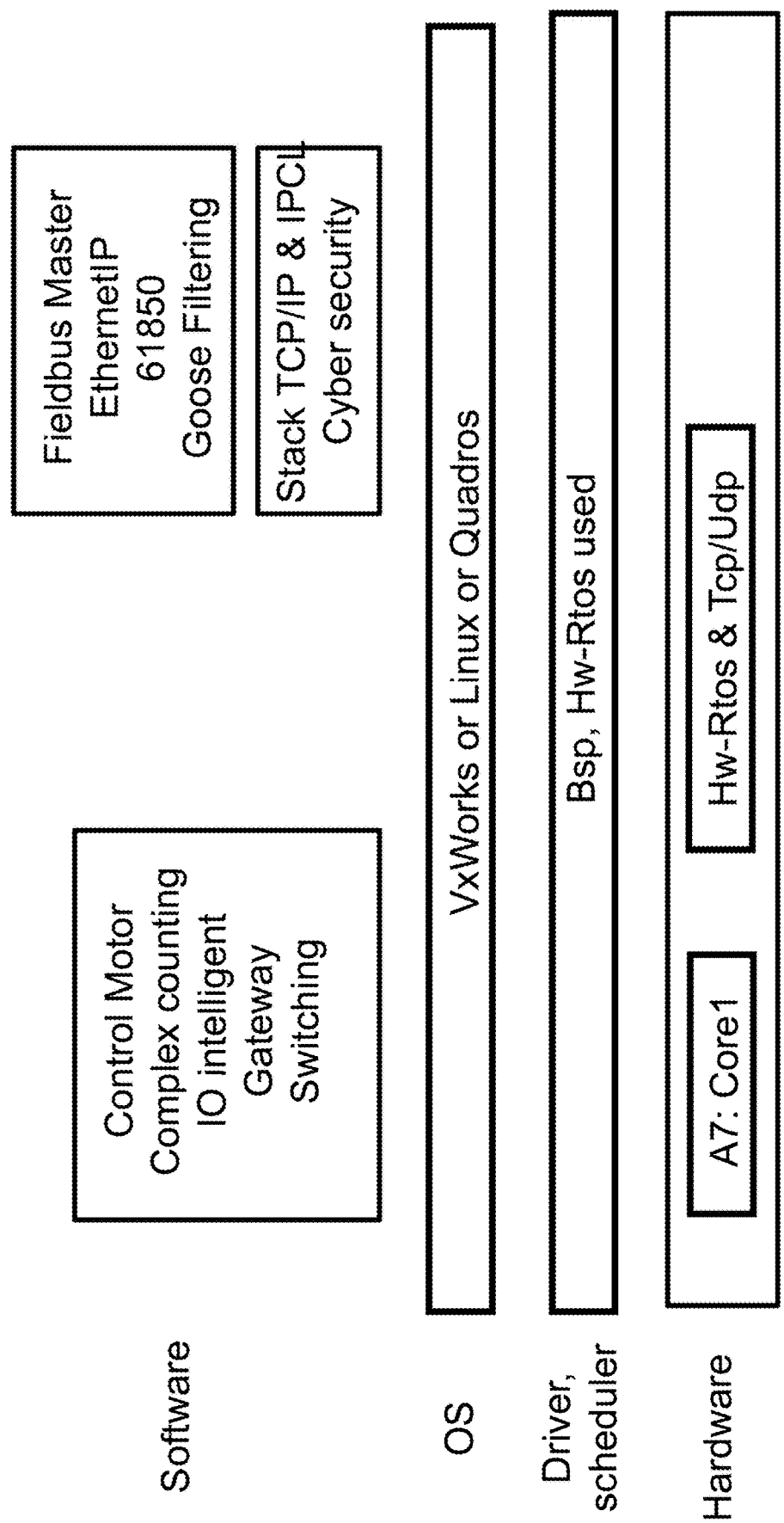
FIG. 13 shows the architecture of an illustrative UES configured for a coprocessor and device application, in accordance with some embodiments.
Figure 14:
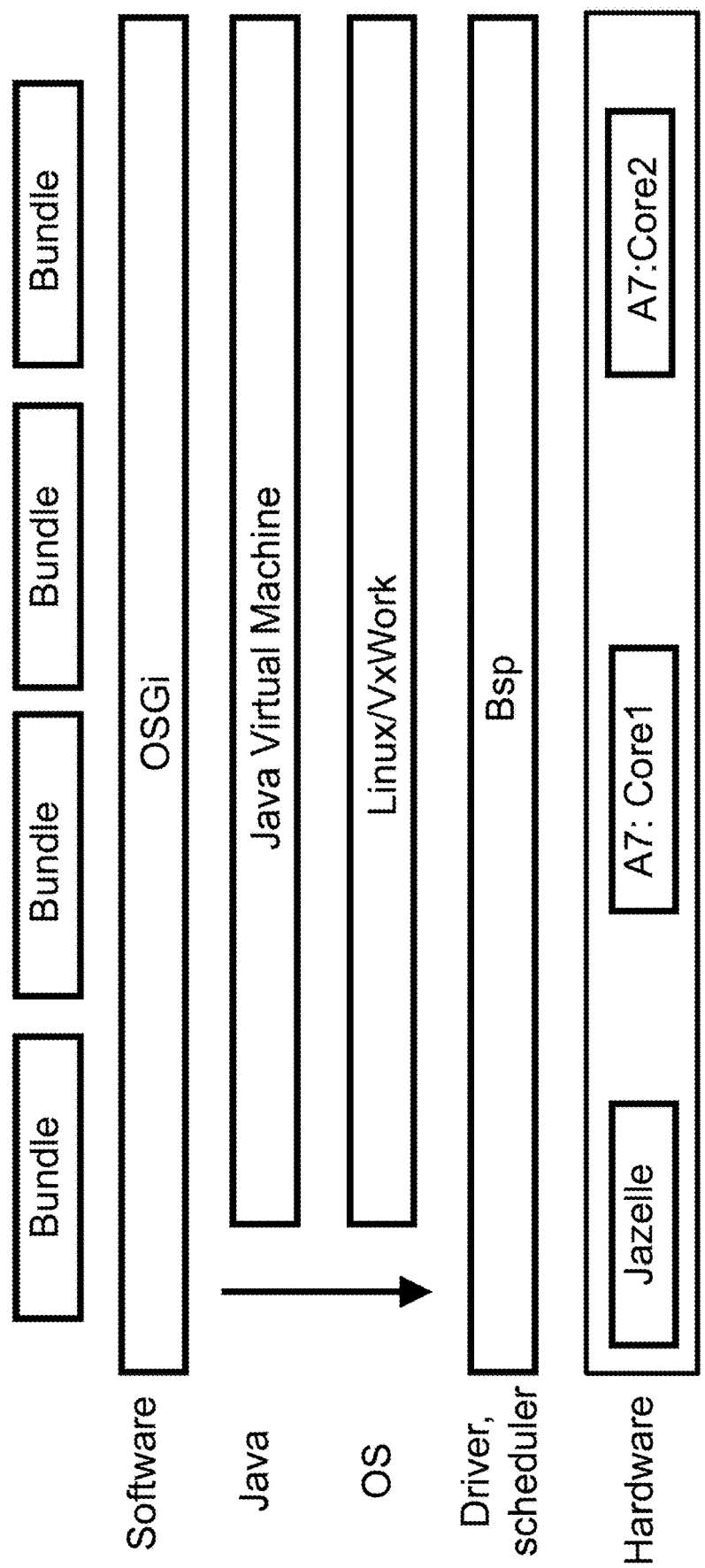
FIG. 14 shows the architecture of an illustrative UES configured for a OneEsp application, in accordance with some embodiments.

FIGS. 11 through 14 schematically depict the architecture of illustrative UES hardware, firmware, and software platforms as may be configured for different illustrative applications/targets. More specifically, FIG. 11 shows an illustrative architecture of a UES configured for a controller application, employing dual-core hardware and an embedded hypervisor that provides a virtualization layer that partitions dual-core hardware into four virtual core partitions, allowing for heterogeneous OS openness and various of modes/configurations, such as SMP mode with respect to one of the hardware cores (e.g., two virtual cores). Also by way of non-limiting example, FIG. 12 shows the architecture of an illustrative UES configured for a controller and device application, employing dual-core hardware with hardware RTOS support (e.g., for real-time Ethernet) and an embedded board support package (Bsp), with an operating system executing in SMP mode across the cores. FIG. 13, by way of non-limiting example, shows the architecture of an illustrative UES configured for a coprocessor and device application, employing a single hardware core with hardware RTOS support (e.g., for real-time Ethernet) and embedded Bsp. And as a further non-limiting example, FIG. 14 shows the architecture of an illustrative UES configured for a OneEsp application (a proprietary One Embedded Service Platform developed by the present applicant/assignee to provide a common embedded services platform meeting the requirement of various businesses), employing dual-core hardware with Jazelle technology hardware extensions to support and accelerate Java Virtual Machine software running applications or components in the form of bundles based on OSGi.

Figure 15:
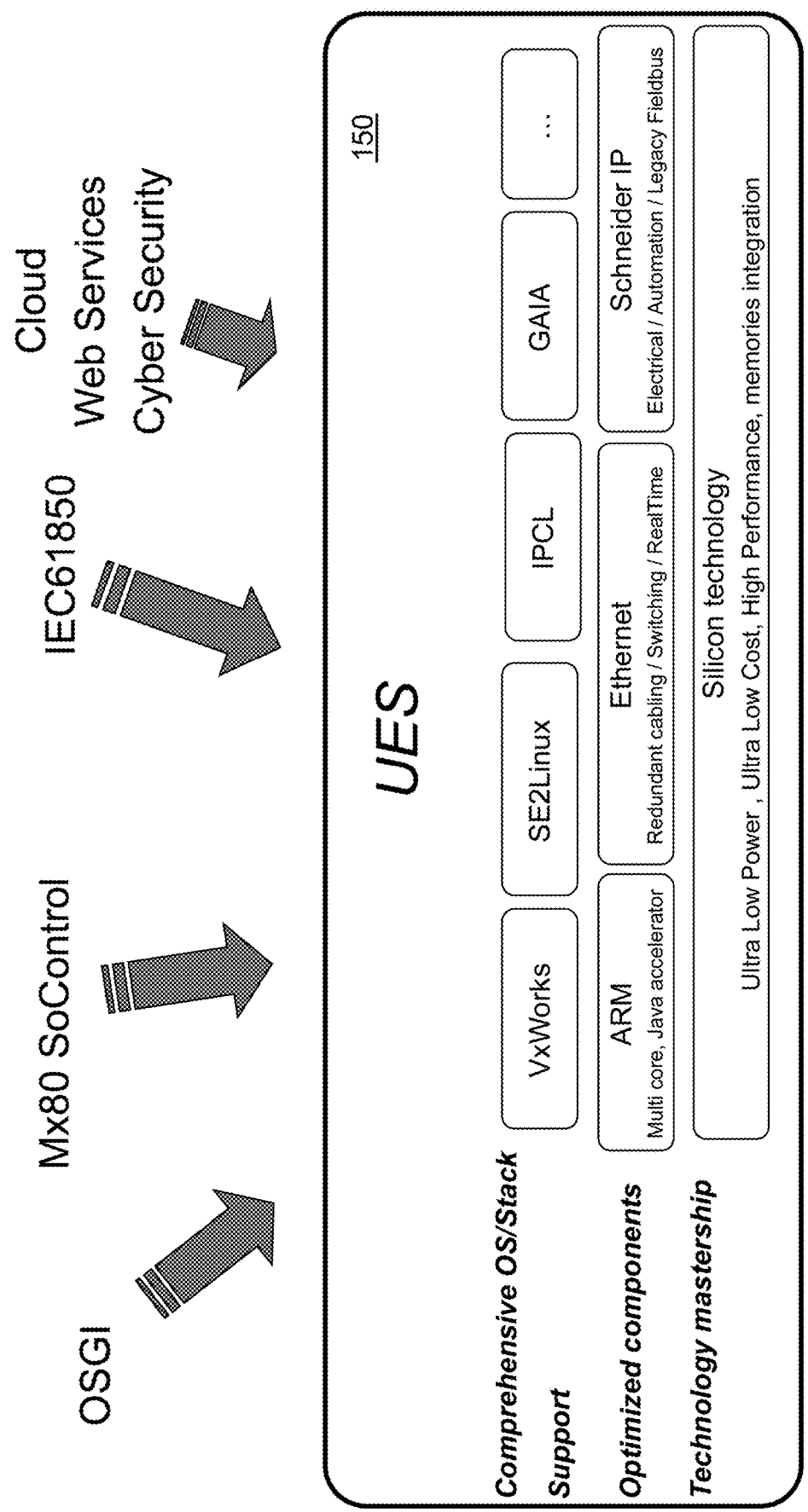
FIG. 15 schematically shows some features of an illustrative UES chip with respect to underlying technology mastership, illustrative optimized components, and comprehensive operating system and stack support, providing a common, single-chip Ethernet solution applicable to myriad target applications/platforms across an industrial automation network, in accordance with some embodiments.

In view of the foregoing illustrative embodiments, it may be understood that a UES chip according to some embodiments of the present invention represents an industrial automation/control solution (e.g., an ASSP), as illustratively depicted, for example, in FIG. 15, which schematically shows some features of an illustrative UES chip 150 with respect to underlying technology mastership, illustrative optimized components, and comprehensive operating system and stack support, providing a common, single-chip Ethernet solution applicable to myriad target applications/platforms across an industrial automation network, such as for routing/gateway nodes, controllers, substations, cloud-based web services and cyber security platforms, etc.

In other words, in view of the foregoing disclosure, those skilled in the art will understand that some embodiments of a UES provide for a cost-effective Ethernet solution, having scalable memory, performance (e.g., including high-performance horsepower), and low-power consumption, thus effectively replacing application, Ethernet protocol, and fieldbus processors (e.g., providing a single-chip solution for device applications, controllers (e.g., low cost PLC), Ethernet modules, etc. For example, in accordance with the foregoing disclosure, it will be understood that a UES chip according to some embodiments may provide and support the following features:

| Feature | UES |
| --- | --- |
| Java Machine | Yes |
| Major feature: | |
| ARM Standard Open Solution | Good |
| Performance | High |
| Flexible memory (Embedded RAM) | High |
| No Memory Size Limitation | Good |
| Crypto. Cyber security | Yes |
| Consumption | Good |
| OPent to all OS: Quadros, VxWork, etc. | Good |
| IPCL Library, Mx80 SoControl, OPC | Good |
| Advanced Ethernet features: | |
| Ethernet IP & MODBUS/TCP | Yes |
| Sercos3 | Yes |
| Ethercat, Profinet, etc. | Yes |
| PRP/HSR | Yes |
| 61850 | Yes |
| Goose and Sample value filtering | Yes |
| RSTP, Daisy-chain loop, 1588 | Yes |
| Connectivity: | |
| Legacy Fieldbus | Yes |
| Wireless connectivity (Zigbee, Wifi, etc.) | Yes |
| Target: | |
| Reuse PLC very low cost | Yes |
| Device Application (e.g., I/O, Drive, Counting, Analog, etc.) | Yes |
| Ethernet low cost module | Yes |

-continued

| Feature | UES |
|---|---|
| HMI Low cost application | Yes |
| Controller (PLC, PMC, Gateway, etc.) | Yes |

Thus, for example, a UES according to some embodiments provides numerous advantages, features, and associated value for developers based on such features, including those summarized as follows:

| UES embodiments allow Developers to . . . | Unique Value Proposal/Feature as provided by Some UES embodiments |
|---|---|
| Concentrate on adding new features and improving TTM (time-to-market), not optimize code and (re-re-re) write low level code | Embedded RAM has significantly more space for data than available current alternative approaches. May account for popular OS and proprietary (e.g., Schneider) applicative stacks support. |
| Keep product cost low | Design options allows global system cost optimization (Reduced set of components around chip). |
| Reduce number of supported platforms, to ease maintenance and reduce development cost | Different versions of the chip allow using same platform, same OS, same drivers in, e.g., both field devices and controllers. |
| Reduce supplier dependance towards non-industrial focused manufacturer | Embedded managed Ethernet switch has all the features currently held by, e.g., Marvell switches and is portable to another technology |
| Reuse code from other entity for design efficiency (e.g., Building protocol in Power product, Energy protocol in Industry product) | Provides for a global corporate brick and solution approach ensuring use and reuse in many projects and activities, making a wide code library become available. |

And, for example, a UES according to some embodiments provides numerous advantages, features. and associated value for a customer based on such features, including those summarized as follows:

| UES Provides Customer . . . | Unique Value Proposal/Feature as provided by Some UES embodiments |
|---|---|
| Ethernet everywhere with real value | Enables use of full IPCL services without features or performance copromise even on lowest cost products. |
| Consistency & Interoperability in features and interfaces | Reuse of same chip, with same software, in many products, whether devices or controllers, thanks to new performance and cost scalability approach. |
| Availability, Flexibility & Transparency of network architectures | Rich Ethernet features allow gateway & router applications. Embedded switch, allows ring, star, double star and chain architectures directly from field devices. |
| Sustainability in existing and future installations | Wide support for existing backplane and fieldbus protocols. Gigabit Ethernet support on some Ethernet ports. |
| Real World Performance | Latest high performance ARM technology for fast execution times and rich features. Optimizations for Real Time Ethernet Innovative memory concept, reduces device startup time. |

It will be understood from the foregoing, that myriad variations and additional or alternative embodiments may be implemented without departing from the scope of the present disclosure. The present invention has been illustrated and described with respect to specific embodiments thereof, which embodiments are merely illustrative of the principles of some embodiments of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. Similarly, the structure and/or function of a component may be combined into a single component or divided among two or more components. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with claims that are based on the present disclosure, as such claims may be presented herein and/or in any patent applications claiming priority to, based on, and/or corresponding to the present disclosure.

What is claimed is:

1. A monolithic integrated circuit, comprising:
at least one application processor core operable to execute an industrial application and Ethernet connectivity/management code, including standard Ethernet connectivity/management code and industrial Ethernet connectivity/management code;
a real-time processing module configured to support a plurality of industrial Ethernet data link layers;
an interface configured to be coupled to an external non-volatile memory from which the at least one application processor is configured for execute-in-place processing;
on-chip RAM having a capacity sufficient to eliminate the need for external RAM in execution by the at least one application processor core of an operating system, the industrial application, and the Ethernet connectivity/management code;
wherein the on chip RAM has a capacity of at least 2 MB, the capacity being sufficient as main execution memory for execution by the at least one application processor of the operating system, the industrial application, and the Ethernet connectivity/management code; and
(i) wherein for each of the operating system, industrial application, and Ethernet connectivity/management code that is configured to be executed in place from the external non-volatile memory, the on chip RAM stores neither the associated initialized data segment nor the associated code, or
(ii) wherein for at least one of the operating system, industrial application, and Ethernet connectivity/management code that is configured to be executed-in-place from the external non-volatile memory, the on chip RAM stores the associated initialized data segment and does not store the associated code.

2. The monolithic integrated circuit according to claim 1, further comprising a master/slave external bus interface configured to provide for direct master/slave communications with another microprocessor.

3. The monolithic integrated circuit according to claim 1, further comprising a soft real-time Ethernet switch, hard real-time Ethernet interfaces, and at least one low-speed fieldbus/comms interface.

4. The monolithic integrated circuit according to claim 3, further comprising at least one port multiplexor configured for multiplexing said soft real-time Ethernet switch and hard real-time Ethernet interfaces to at least one port of the monolithic integrated circuit.

5. The monolithic integrated circuit according to claim 3, wherein the soft real-time Ethernet switch, the hard real-time Ethernet interfaces, and the at least one low-speed fieldbus/comms interface each include corresponding physical layer (PHY) circuitry for each of respective protocols needed for the Ethernet and the at least one fieldbus/comms.

6. The monolithic integrated circuit according to claim 1, wherein the monolithic integrated circuit does not include on-chip Flash memory.

7. The monolithic integrated circuit according to claim 6, wherein the monolithic integrated circuit does not include any on-chip non-volatile memory used for storing any one or more of (i) the industrial application, (ii) the Ethernet connectivity/management code, and (iii) the operating system.

8. The monolithic integrated circuit according to claim 1, wherein the at least one processor is configured to execute-in-place from the external non-volatile memory at least one of the operating system, the industrial application, and the Ethernet connectivity/management code, and wherein the monolithic integrated circuit is configured such that during execution the on-chip RAM (i) stores at least the changeable process data associated with execution of the operating system, the industrial application, and the Ethernet connectivity/management code, and (ii) does not store code associated with each of the operating system, the industrial application, and the Ethernet connectivity/management code that is subject to execution-in-place.

9. The monolithic integrated circuit according to claim 1, wherein during execution at least one of the following code is stored in and executed from the on-chip RAM: (i) performance and latency critical code, such as the real-time processor code; (ii) self-modifying code; and (iii) code whose execution purpose is not compatible with execute-in-place (XIP), including any erase/write routines for the external non-volatile memory.

10. The monolithic integrated circuit according to claim 1, wherein the on-chip RAM has a capacity of about 2 MB to about 128 MB, or
wherein the on-chip RAM has a capacity of about 2 MB to about 6 MB, or
wherein the on-chip RAM has a capacity of about 6 MB to about 15 MB, or
wherein the on-chip RAM has a capacity of about 15 MB to about 25 MB, or
wherein the on-chip RAM has a capacity of about 50 MB to about 128 MB.

11. A monolithic integrated circuit, comprising:
at least one application processor core operable to execute an industrial application and Ethernet connectivity/management code, including standard Ethernet connectivity/management code and industrial Ethernet connectivity/management code;
a real-time processing module configured to support a plurality of industrial Ethernet data link layers;
an interface configured to be coupled to an external non-volatile memory from which the at least one application processor is configured for execute-in-place processing;
on-chip RAM having a capacity sufficient to eliminate the need for external RAM in execution by the at least one application processor core of an operating system, the industrial application, and the Ethernet connectivity/management code;
a master/slave external bus interface configured to provide for direct master/slave communications with another microprocessor;
a soft real-time Ethernet switch, hard real-time Ethernet interfaces, and at least one low-speed fieldbus/comms interface;
wherein the on chip RAM has a capacity of at least 2 MB, the capacity being sufficient as main execution memory for execution by the at least one application processor of the operating system, the industrial application, and the Ethernet connectivity/management code; and
(i) wherein for each of the operating system, industrial application, and Ethernet connectivity/management code that is configured to be executed in place from the external non-volatile memory, the on chip RAM stores neither the associated initialized data segment nor the associated code, or
(ii) wherein for at least one of the operating system, industrial application, and Ethernet connectivity/management code that is configured to be executed-in-place from the external non-volatile memory, the on chip RAM stores the associated initialized data segment and does not store the associated code.

12. The monolithic integrated circuit according to claim 11, further comprising at least one port multiplexor configured for multiplexing said soft real-time Ethernet switch and hard real-time Ethernet interfaces to at least one port of the monolithic integrated circuit.

13. The monolithic integrated circuit according to claim 12, wherein the soft real-time Ethernet switch, the hard real-time Ethernet interfaces, and the at least one low-speed fieldbus/comms interface each include corresponding physical layer (PHY) circuitry for each of respective protocols needed for the Ethernet and the at least one fieldbus/comms.

14. The monolithic integrated circuit according to claim 11, wherein the monolithic integrated circuit does not include on-chip Flash memory.

15. The monolithic integrated circuit according to claim 14, wherein the monolithic integrated circuit does not include any on-chip non-volatile memory used for storing any one or more of (i) the industrial application, (ii) the Ethernet connectivity/management code, and (iii) the operating system.

16. A monolithic integrated circuit, comprising:
at least one application processor core operable to execute an industrial application and Ethernet connectivity/management code, including standard Ethernet connectivity/management code and industrial Ethernet connectivity/management code;
a real-time processing module configured to support a plurality of industrial Ethernet data link layers;

an interface configured to be coupled to an external non-volatile memory from which the at least one application processor is configured for execute-in-place processing;

on-chip RAM having a capacity sufficient to eliminate the need for external RAM in execution by the at least one application processor core of an operating system, the industrial application, and the Ethernet connectivity/management code;

a master/slave external bus interface configured to provide for direct master/slave communications with another microprocessor;

wherein the monolithic integrated circuit does not include on-chip Flash memory;

wherein the on chip RAM has a capacity of at least 2 MB, the capacity being sufficient as main execution memory for execution by the at least one application processor of the operating system, the industrial application, and the Ethernet connectivity/management code; and (i) wherein for each of the operating system, industrial application, and Ethernet connectivity/management code that is configured to be executed in place from the external non-volatile memory, the on chip RAM stores neither the associated initialized data segment nor the associated code, or (ii) wherein for at least one of the operating system, industrial application, and Ethernet connectivity/management code that is configured to be executed-in-place from the external non-volatile memory, the on chip RAM stores the associated initialized data segment and does not store the associated code.

17. The monolithic integrated circuit according to claim 16, further comprising a soft real-time Ethernet switch, hard real-time Ethernet interfaces, and at least one low-speed fieldbus/comms interface, wherein the monolithic integrated circuit does not include any on-chip non-volatile memory used for storing any one or more of (i) the industrial application, (ii) the Ethernet connectivity/management code, and (iii) the operating system.

18. The monolithic integrated circuit according to claim 16, wherein the at least one processor is configured to execute-in-place from the external non-volatile memory at least one of the operating system, the industrial application, and the Ethernet connectivity/management code, and wherein the monolithic integrated circuit is configured such that during execution the on-chip RAM (i) stores at least the changeable process data associated with execution of the operating system, the industrial application, and the Ethernet connectivity/management code, and (ii) does not store code associated with each of the operating system, the industrial application, and the Ethernet connectivity/management code that is subject to execution-in-place.

19. The monolithic integrated circuit according to claim 16, further comprising a soft real-time Ethernet switch, hard real-time Ethernet interfaces, and at least one low-speed fieldbus/comms interface, wherein during execution at least one of the following code is stored in and executed from the on-chip RAM: (i) performance and latency critical code, such as the real-time processor code; (ii) self-modifying code; and (iii) code whose execution purpose is not compatible with execute-in-place (XIP), including any erase/write routines for the external non-volatile memory; and wherein for at least one of the operating system, industrial application, and Ethernet connectivity/management code that is configured to be executed-in-place from the external non-volatile memory, the on chip RAM stores the associated initialized data segment and does not store the associated code.

20. The monolithic integrated circuit according to claim 16, further comprising a soft real-time Ethernet switch, hard real-time Ethernet interfaces, and at least one low-speed fieldbus/comms interface, wherein the on-chip RAM has a capacity of about 2 MB to about 128 MB, and wherein for each of the operating system, industrial application, and Ethernet connectivity/management code that is configured to be executed in place from the external non-volatile memory, the on chip RAM stores neither the associated initialized data segment nor the associated code.

21. A monolithic integrated circuit, comprising:
at least one application processor core operable to execute an industrial application and Ethernet connectivity/management code, including standard Ethernet connectivity/management code and industrial Ethernet connectivity/management code;

a real-time processing module configured to support a plurality of industrial Ethernet data link layers;

an interface configured to be coupled to an external non-volatile memory from which the at least one application processor is configured for execute-in-place processing;

on-chip RAM having a capacity sufficient to eliminate the need for external RAM in execution by the at least one application processor core of an operating system, the industrial application, and the Ethernet connectivity/management code;

a master/slave external bus interface configured to provide for direct master/slave communications with another microprocessor;

a soft real-time Ethernet switch, hard real-time Ethernet interfaces, and at least one low-speed fieldbus/comms interface;

wherein the monolithic integrated circuit does not include on-chip Flash memory;

wherein the on chip RAM has a capacity of at least 2 MB, the capacity being sufficient as main execution memory for execution by the at least one application processor of the operating system, the industrial application, and the Ethernet connectivity/management code; and (i) wherein for each of the operating system, industrial application, and Ethernet connectivity/management code that is configured to be executed in place from the external non-volatile memory, the on chip RAM stores neither the associated initialized data segment nor the associated code, or (ii) wherein for at least one of the operating system, industrial application, and Ethernet connectivity/management code that is configured to be executed-in-place from the external non- volatile memory, the on chip RAM stores the associated initialized data segment and does not store the associated code.

* * * * *